United States Patent [19]

Morris

[11] Patent Number: 5,754,610
[45] Date of Patent: May 19, 1998

[54] IN-MAST SIPPING MODULAR MAST MODIFICATION

[75] Inventor: Stephen Morris, Lynchburg, Va.

[73] Assignee: Framatome Technologies, Inc., Lynchburg, Va.

[21] Appl. No.: 760,710

[22] Filed: Dec. 5, 1996

[51] Int. Cl.⁶ ................................................ G21C 17/07
[52] U.S. Cl. ............................................................ 376/253
[58] Field of Search ................................ 376/253, 251

[56] References Cited

U.S. PATENT DOCUMENTS

| | | | |
|---|---|---|---|
| 3,947,318 | 3/1976 | Zhuchkov et al. | 376/253 |
| 4,034,599 | 7/1977 | Osborne | 376/253 |
| 4,225,388 | 9/1980 | Bellaiche et al. | 376/253 |
| 4,696,788 | 9/1987 | Seli | 376/253 |
| 5,383,226 | 1/1995 | Deleryd et al. | 376/253 |
| 5,457,720 | 10/1995 | Snyder et al. | 376/253 |
| 5,546,435 | 8/1996 | Collin et al. | 376/253 |
| 5,570,400 | 10/1996 | Minor et al. | 376/253 |

*Primary Examiner*—Daniel D. Wasil
*Attorney, Agent, or Firm*—Rhodes Coats & Bennett, L.L.P.

[57] ABSTRACT

An apparatus for testing a nuclear fuel assembly for leaks by sweeping a fluid along the fuel assembly while the fuel assembly is disposed in a pool. The apparatus includes a bridge overlying the pool and a mast assembly depending from the bridge. The mast assembly includes an outer, stationary mast and an inner, movable mast adapted to hold the fuel assembly and to position the fuel assembly in the interior channel between the upper and lower ends. The apparatus includes an injection assembly including an injection conduit, a nozzle and a clamp system for securing the nozzle to the outer mast. The apparatus also includes a suction conduit having an inlet disposed in fluid communication with the interior channel for collecting the fluid after the fluid sweeps the fuel assembly.

15 Claims, 3 Drawing Sheets

IN-MAST SIPPING MODULAR MAST MODIFICATION

BACKGROUND OF THE INVENTION (1) Field of the Invention

The present invention relates generally to an apparatus for detecting leaks in nuclear fuel assemblies, and, more particularly, to an apparatus for performing on-line sipping leak testing.

(2) Description of the Prior Art

The core of a nuclear reactor includes a plurality of nuclear fuel bundle assemblies, each such assembly in turn including a plurality of nuclear fuel rods. Each fuel rod includes a cladding into which a plurality of nuclear fuel pellets are stacked in a vertical column with plugs sealing each end of the cladding. In addition to structural integrity, the cladding prevents contact and chemical reaction between the nuclear fuel and the coolant/moderator. The cladding also prevents the radioactive fission products, some of which are gases, from being released from the fuel rod into the coolant/moderator. Failure of cladding, due to debris in the coolant/moderator system or any other reason, may result in contamination of the coolant/moderator and associated system.

In view of the foregoing, it is necessary to periodically test for leakage in the fuel rod cladding. One of the most frequently used method for testing the tightness of the cladding is sipping. In sipping, the pressure of the gases in the cladding is increased by increasing the temperature (by supplying heat or by the residual thermal power of the fuel) so that the fission products are released in the case of a defect in the cladding. A fluid is provided to sweep the claddings of the assembly and the fluid is thereafter measured to determine its activity or increase in activity following sweeping the claddings.

Leak detection is preferably carried out when the reactor is shut down for refueling. This may be accomplished using one of two conventional general processes. In "canned sipping", fuel assemblies are removed from the core and tested in a spent fuel pool. Canned sipping suffers from the drawbacks inherent in removing a fuel assembly from the core, transporting it to a spent fuel pool, transporting it back to the core, and reloading it in the core.

In "on-line sipping", a mast assembly supported over the core by a bridge is used to lift the fuel assembly to the desired level in the reactor water above the core, where it is leak tested. Thereafter, the fuel assembly is placed in its new location in the shuffled core. While on-line sipping as described above provides significant advantages for leak testing fuel assemblies which are to be returned to the core, it has conventionally required certain permanent modifications to the mast assemblies. For example, hoses for providing compressed air at the bottom opening of the mast have been permanently attached to the outer mast using banding or other methods. The compressed air nozzles themselves are typically mounted by drilling into the outer mast. The existing roller housing which contains the cables for raising and lowering an inner mast are typically replaced with modified roller housings which incorporate the suction hoses for collecting the gas from the nozzles after the gas sweeps the fuel assembly.

Furthermore, the prior art method and apparatus as described above for conducting on-line sipping are relatively expensive and time consuming. Mounting of the various components on the mast assembly cannot feasibly be done using remote means. Thus, the pool must be drained to allow scaffolding to be erected and workers to manually mount the components. The fact that the components are permanently mounted reduces flexibility and use of the mast assembly. Further, the replacement of the roller housings necessitates application for and receipt of regulatory approval, which is also expensive and time consuming.

Thus, there exists a need for an improved means for conducting on-line sipping for testing nuclear fuel assemblies which is modular; easily mountable on an existing mast assembly; and also easily demountable from the mast assembly while, at the same time, is cost effective and efficient.

SUMMARY OF THE INVENTION

The present invention is directed to an apparatus for testing a nuclear fuel assembly for leaks by sweeping a fluid along the fuel assembly while the fuel assembly is disposed in a pool. The apparatus includes a bridge overlying the pool and a mast assembly depending from the bridge.

The mast assembly includes an outer, stationary mast and an inner, movable mast. The outer mast includes upper and lower ends and an interior channel extending between the ends. The inner mast is adapted to hold the fuel assembly and to position the fuel assembly in the interior channel between the upper and lower ends.

The apparatus includes an injection assembly including an injection conduit, a nozzle and a clamp system. The nozzle is disposed proximate the lower end and is operative to introduce fluid into the interior channel and the nozzle is secured to the outer mast. In the preferred embodiment, the clamp system includes a clamp member adapted to hold the nozzle and to detachably secure the nozzle to the lower end of the mast proximate the interior channel.

The apparatus also includes a suction conduit having an inlet disposed in fluid communication with the interior channel for collecting the fluid after the fluid sweeps the fuel assembly. In the preferred embodiment, a support hoop is adapted to surround a portion of the mast above the lower end and to secure the injection conduit to an outer surface of the mast.

Accordingly, one aspect of the present invention is to provide an apparatus for testing a nuclear fuel assembly for leaks by sweeping a fluid along the fuel assembly while the fuel assembly is disposed in a pool. The apparatus includes: a) a bridge overlying the pool; b) a mast assembly depending from the bridge and including an outer, stationary mast and an inner, movable mast, the outer mast having upper and lower ends and an interior channel extending between the ends, the inner mast adapted to hold the fuel assembly and to position the fuel assembly in the interior channel between the upper and lower ends; c) an injection assembly including an injection conduit and a nozzle, the nozzle disposed proximate the lower end and operative to introduce fluid into the interior channel and the nozzle secured to the outer mast; and d) a suction conduit having an inlet disposed in fluid communication with the interior channel for collecting the fluid after the fluid sweeps the fuel assembly.

Another aspect of the present invention is to provide a clamp system for use with an apparatus for testing a nuclear fuel assembly for leaks by sweeping a fluid along the fuel assembly while the fuel assembly is disposed in a pool, the testing apparatus of the type including an outer mast having a lower end and an interior channel extending thereabove, an injection conduit and a nozzle. The clamp system includes a clamp member adapted to hold the nozzle and to detachably secure the nozzle to the lower end of the mast proximate the interior channel.

Still another aspect of the present invention is to provide an apparatus for testing a nuclear fuel assembly for leaks by sweeping a fluid along the fuel assembly while the fuel assembly is disposed in a pool. The apparatus includes: a) a bridge overlying the pool; b) a mast assembly depending from the bridge and including an outer, stationary mast and an inner, movable mast, the outer mast having upper and lower ends and an interior channel extending between the ends, the inner mast adapted to hold the fuel assembly and to position the fuel assembly in the interior channel between the upper and lower ends; c) an injection assembly including an injection conduit, a nozzle and a clamp system, the nozzle disposed proximate the lower end and operative to introduce fluid into the interior channel and the nozzle secured to the outer mast, the clamp system including a clamp member adapted to hold the nozzle and to detachably secure the nozzle to the lower end of the mast proximate the interior channel; d) a suction conduit having an inlet disposed in fluid communication with the interior channel for collecting the fluid after the fluid sweeps the fuel assembly; and e) a support hoop adapted to surround a portion of the mast above the lower end and to secure the injection conduit to an outer surface of the mast.

These and other aspects of the present invention will become apparent to those skilled in the art after a reading of the following description of the preferred embodiment when considered with the drawings.

DESCRIPTION OF THE PREFERRED EMBODIMENTS

Figure 1:
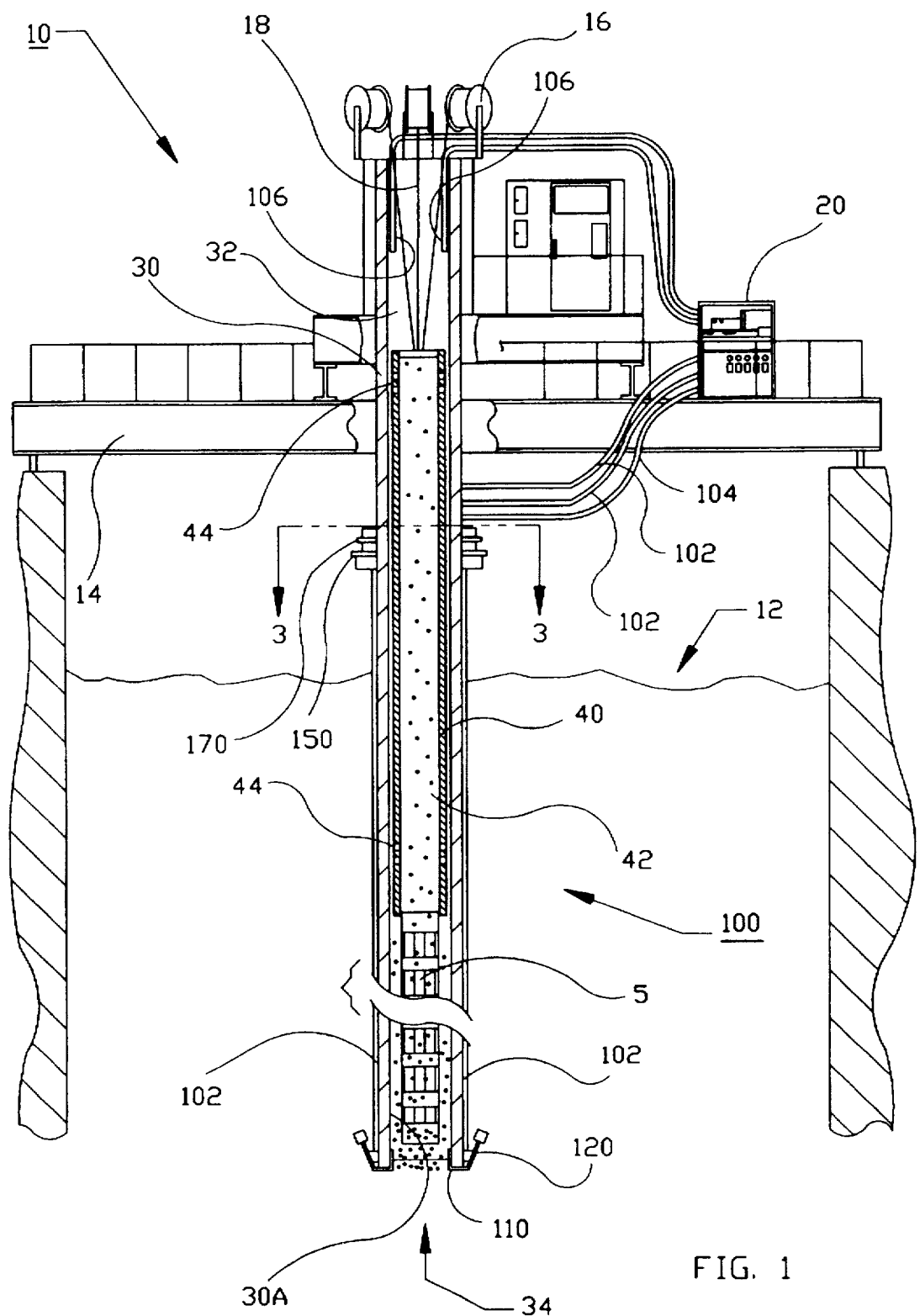
FIG. 1 is a fragmentary, cross sectional, side elevational view of an on-line sipping leak testing apparatus according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, an on-line sipping nuclear fuel assembly leak testing system, generally designated 10, is shown constructed according to the present invention.

Leak testing is performed with a nuclear fuel assembly 5 submerged in a moderator pool 12 located above the reactor core (not shown). Fuel assembly 5 is supported by inner mast or hoist box 40 which depends from bridge 14. When positioned for testing as shown, fuel assembly 5 is surrounded by outer mast 30 which is also supported by bridge 14. More particularly, fuel assembly 5 may be raised from the core and positioned within outer mast 30 by means of driven rollers 16 and connecting cables 18. After testing is complete, fuel assembly 5 may be lowered back into the core by the rollers and connecting cables.

Turning to inner mast 40 and outer mast 30 in more detail, each mast is a generally tubular member being open at the lower end thereof. Inner mast 40 and outer mast 30 define interior channels 42 and 32, respectively. When fuel assembly 5 is secured to inner mast 40, the lower opening thereof is substantially filled by the upper end of the fuel assembly. Inner mast 40 has vents 44 at the upper and lower ends thereof. Outer mast 30 has inner surface 30A and outer surface 30B (see FIG. 2). The relative movement and alignment of inner mast 40 and outer mast 30 is facilitated by rollers 22 and guide blocks 24 (see FIG. 3). The masts as described just above are conventional, and their constructions and suitable materials will be readily appreciated by those of ordinary skill in the art.

Leak testing system 10 further includes control cabinet 20 of conventional construction and operability. Upper suction lines or hoses 106 extend from control cabinet 20 over the top of outer mast 30, and into interior channel 32, and terminate at locations above the upper end of inner mast 40. Lower suction line 104 extends from control cabinet 20, over the upper end of outer mast 30, and into interior channel 32, and forks into subhoses which terminate at cup assemblies 170 (as discussed in more detail below) located below the upper end of inner mast 40 and above the level of pool 12. Injection lines 102 extend from control cabinet 20 and along the outer surface of outer mast 30, and terminate at nozzles 110. Injection lines 102 are mounted by means of support hoop 150 and clamp members 120, both described in more detail below. The upper ends of the injection hoses are supported by retaining cables and tubing clamps attached to the support hoop 150.

Nozzle 110 is preferably an aspirator or air type aspirator. Each of lines 102, 104, 106 is preferably formed from rubber. However, these lines may be formed from other suitable materials such as stainless steel, as well.

The general process for on-line sipping is well known, and therefore will be discussed only briefly herein. Compressed air is introduced at control cabinet 20 and forced through injection lines 102 and out nozzle 110. The air bubbles from nozzle 110 sweep up through fuel assembly 5 and exit at the top of fuel assembly 5 into interior channel 42 of inner mast 40. Thereafter, the air exits inner mast 40 through vents 44 and is collected by upper suction lines 106. The air collected in upper suction lines 106 is analyzed by appropriate comparator apparatus, preferably housed in control cabinet 20. Any of the air from nozzle 110 which does not enter inner mast 40 is collected by lower suction lines 104. It will be appreciated that the apparatus of the present invention may be used to practice other methods of leak testing or modifications of the process just described. For example, fluids other than air may be used to sweep the fuel assembly.

Figure 3:
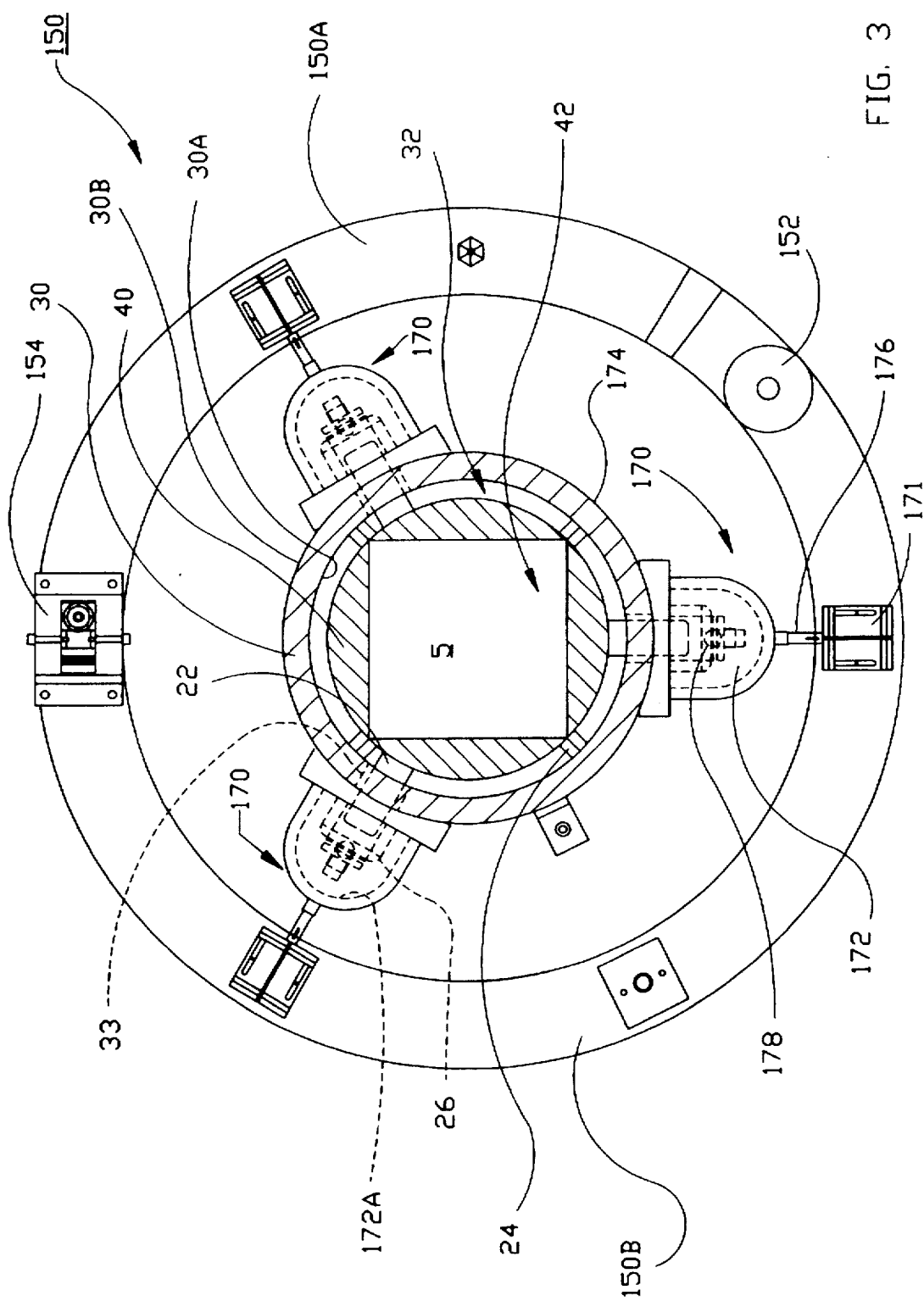
FIG. 3 is a top cross sectional, fragmentary view of the leak testing apparatus as viewed along the line 3—3 of FIG. 1 and showing a support hoop and cup assemblies forming a part of the present invention.

With reference to FIGS. 1 and 3, support hoop 150 surrounds outer mast 30 and serves to mount various components of system 10 thereto. Support hoop 150 includes arcuate arms 150A, 150B connected by hinge 152 and latch 154. Pneumatic clamping cylinders 171 are fixedly mounted on support hoop 150. Each connector arm 176 has one end integral with or attached to the piston of the respective clamping cylinder 171 and the other end secured to a cup assembly housing 172. Cup assembly housings 172 each define a cavity 172A sized and shaped to fit over and envelop an upper roller housing 26. The upper roller housings 26 conventionally form a part of the mast system and are fixedly mounted on the outer mast. Further, housings 172 have arcuate contact walls 174 adapted to fit the shape of the curved outer wall 30B of outer mast 30.

Support hoop 150 is mounted on outer mast 30 by releasing latch 154 and opening arms 150A, 150B about hinge 152. Support hoop 150 is positioned about the outer mast such that, when arms 150A, 150B are reclosed and latch 154 relocked, cup assembly housings 172 receive roller housings 26 in respective cavities 172A. Clamping cylinders 171 are initially in a retracted position so that contact walls 174 do not bear against the outer wall of the mast when the support hoop is latched. Once support hoop 150 is in place, clamping cylinders 171 are actuated to force contact walls 174 into engagement with the mast. Support hoop 150 and the components supported thereby are held in place by the frictional engagement of contact walls 174 with outer surface 30B of mast 30, and by cup assembly housings 172 hanging from roller housings 26. Removal of support hoop 150 from the mast is the reverse of installation.

Each cup assembly housing 172 has a nipple 178 in fluid communication with the respective cavity 172A. Each cavity 172A is in turn in fluid communication with a respective orifice 33 formed in mast 30 through which a roller 22 extends. In this way, fluid communication is provided between interior channel 32 and nipples 178. The inlet ends of lower suction hoses 104 are fitted to respective nipples 178, thereby allowing the lower suction hoses to sample the fluid in the channel between the inner and outer masts. Preferably, a single lower suction hose 104 extends from control cabinet 20 and forks into three subhoses (not shown) of equal length which each terminate at a respective nipple 178. Hoses 102, 104 have been omitted from FIG. 3 for clarity, however their configurations and suitable fixtures and methods for connecting hoses 104 to the nipples will be readily apparent to those of ordinary skill in the art from the foregoing.

Figure 2:
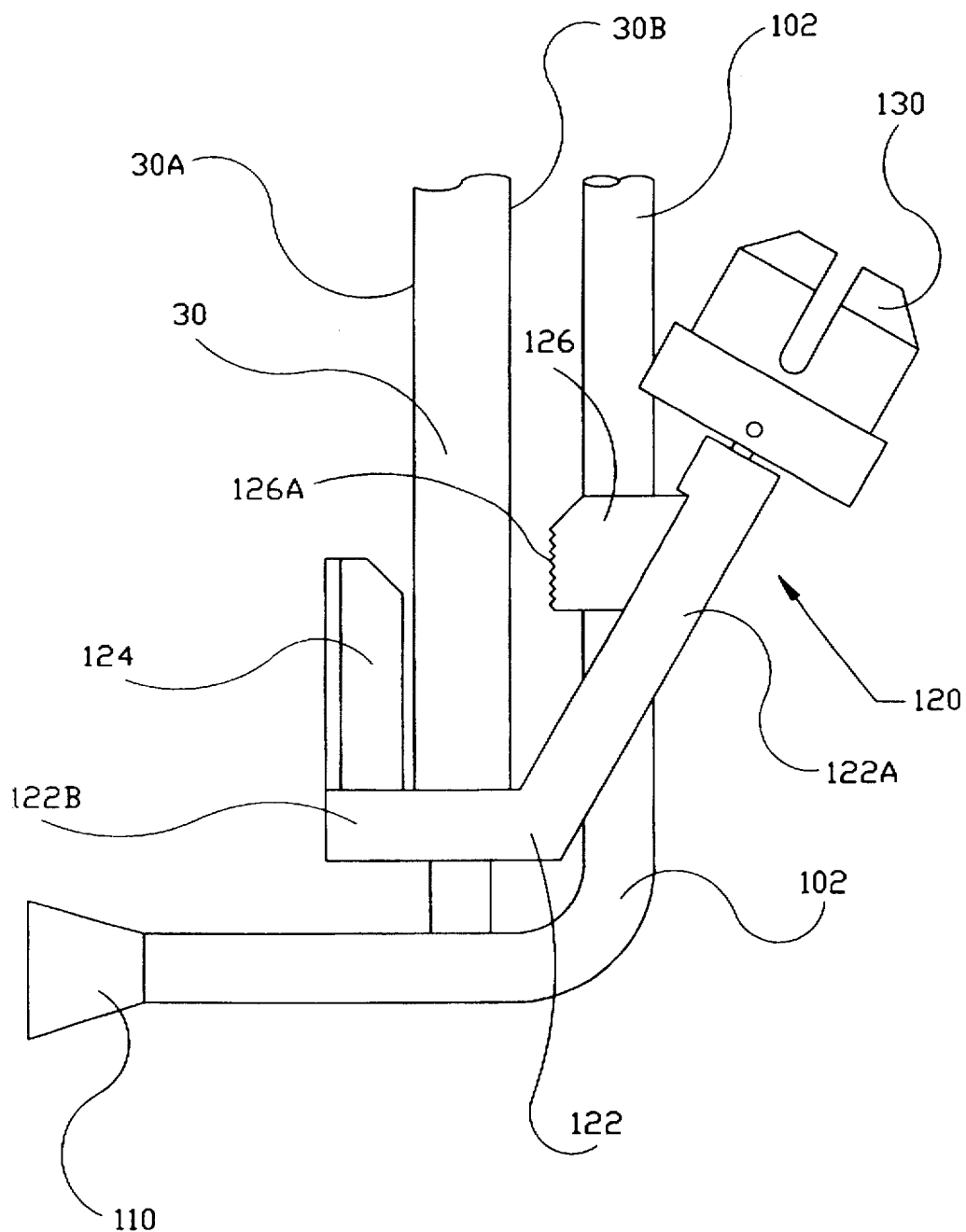
FIG. 2 is a fragmentary, side elevational view of a lower clamp forming a part of the present invention mounted on an outer mast.

Turning to FIG. 2, a clamp member 120 is shown therein in greater detail. The injection lines 102 are mounted to nozzle 110 by Swaglok® fittings and the nozzle is secured to clamp member 120 by a stainless steel clamp. Clamp member 120 includes connecting member 122 having lower leg 122B and upper leg 122A. Lip or bracing wall 124 extends upwardly from leg 122B and is rigidly secured thereto. Movable block 126 is mounted on leg 122A for slidable movement up and down the leg. More particularly, tool receiving head 130 is provided whereby rotation of head 130 causes block 126 to selectively reposition along leg 122A. Block 126 once positioned resists movement along leg 122A unless tool receiving head 130 is rotated. The adjustability and position locking of block 126 may be provided by any suitable means, for example, by means of a screw type mechanism. Block 126 has clamp face 126A, preferably provided with ribs or teeth. Clamp member 120 is preferably formed from stainless steel.

In use, clamp member 120, and thus the lower end of injection line 102 and nozzle 110, is secured to the lower rim of outer mast 30 by adjusting block 126 downward until lip 124 abuts inner surface 30A and clamp face 126A abuts outer surface 30B, providing an interference fit between clamp member 120 and outer mast 30. It will be appreciated that other clamping mechanisms and configurations may be used as well.

Preferably, strain relief cables are provided between support hoop 150 and nozzle clamps 120 and between support hoop 150 and the upper bridge trolley supports. The cables are attached by stainless steel cable clamps and cable stops. Also, strain relief cables are preferably provided between support hoop 150 and clamp members 120.

The strain relief cables are held tightly in order to help keep the support hoop and clamp members in place and to prevent the support hoop and clamp members from falling into the pool if they come loose.

It will be appreciated that the leak testing system 10, and particularly clamp member 120, support hoop 150, and cup assemblies 170, provide for significant advantages over conventional on-line sipping apparatus. The requisite lines and nozzles may be quickly and non-destructively mounted on the outer mast and roller housings during refueling and quickly and non-destructively removed from the outer mast and roller housings after the leak testing has been completed. Moreover, because the leak testing components are only temporarily mounted and are not present during operation of the reactor, the suction and injection lines may be formed from polyethylene or similar materials which are cheap, readily available, and disposable.

Because the leak testing system of the present invention does not interfere with the normal operation of the reactor, and does not necessitate the replacement of any pre-existing components, the need for regulatory approval is eliminated or minimized. The man hours spent in the radiation field are reduced. The need for permanent mast modifications that could have an adverse effect on the fuel handling bridge's operability is eliminated. The overall set up time and site support requirement for installing the leak testing equipment is substantially decreased. Each of the suction lines, injection lines, and nozzles are remotely mountable and removable so that they may be installed and removed without draining the pool.

Certain modifications and improvements will occur to those skilled in the art upon a reading of the foregoing description. By way of example, since each mast may be somewhat different, the actual placement and design of louvers and porting on each inner mast to stream the bubble flow from the fuel assembly to the outer mast may vary. It should be understood that all such modifications and improvements have been deleted herein for the sake of conciseness and readability but are properly within the scope of the following claims.

I claim:

1. An apparatus for testing a nuclear fuel assembly for leaks by sweeping a fluid along the fuel assembly while the fuel assembly is disposed in a pool, the apparatus comprising:
   a) a bridge overlying the pool;
   b) a mast assembly depending from said bridge and including an outer, stationary mast and an inner, movable mast, said outer mast having upper and lower ends and an interior channel extending between said ends, said inner mast adapted to hold the fuel assembly and to position the fuel assembly in said interior channel between said upper and lower ends;
   c) an injection assembly including an injection conduit and a nozzle, said nozzle disposed proximate said lower end and operative to introduce fluid into the interior channel and said nozzle secured to said outer mast;
   d) a suction conduit having an inlet disposed in fluid communication with said interior channel for collecting the fluid after the fluid sweeps the fuel assembly; and
   e) a support hoop adapted to surround a portion of the mast above the lower end and to secure the injection conduit to an outer surface of the mast.

2. The apparatus according to claim 1 wherein said support hoop includes at least a pair of hingedly connected arms and a latch for releasably securing said pair of arms in a closed position.

3. The apparatus according to claim 1 wherein said support hoop is adapted to secure a suction conduit to the mast.

4. The apparatus according to claim 3 including at least one cup assembly housing mounted on said support hoop, said at least one cup assembly housing having a cavity defined therein adapted to receive a roller housing secured to the mast.

5. The apparatus according to claim 4 wherein said at least one cup assembly housing includes an opening in fluid communication with said cavity, whereby, when an inlet end of the suction conduit is mounted on said opening and said cavity is mounted in fluid communication with the interior channel of the outer mast, the suction conduit is in fluid communication with the interior channel.

6. The apparatus according to claim 1 further including a control cabinet operative to control the flow of fluid through said injection conduit and into said interior channel and to analyze the fluid collected in said suction conduit.

7. An apparatus for testing a nuclear fuel assembly for leaks by sweeping a fluid along the fuel assembly while the fuel assembly is disposed in a pool, said apparatus comprising:

a) a bridge overlying the pool;

b) a mast assembly depending from said bridge and including an outer, stationary mast and an inner, movable mast, said outer mast having upper and lower ends and an interior channel extending between said ends, said inner mast adapted to hold the fuel assembly and to position the fuel assembly in said interior channel between said upper and lower ends;

c) an injection assembly including an injection conduit, a nozzle and a clamp system, said nozzle disposed proximate said lower end and operative to introduce fluid into the interior channel and said nozzle secured to said outer mast, said clamp system including a clamp member adapted to hold the nozzle and to detachably secure the nozzle to the lower end of the mast proximate the interior channel;

d) a suction conduit having an inlet disposed in fluid communication with said interior channel for collecting the fluid after the fluid sweeps the fuel assembly; and e) a support hoop adapted to surround a portion of the mast above the lower end and to secure the injection conduit to an outer surface of the mast.

8. The apparatus according to claim 7 wherein said support hoop includes at least a pair of hingedly connected arms and a latch for releasably securing said pair of arms in a closed position.

9. The apparatus according to claim 7 wherein said support hoop is adapted to secure a suction conduit to the mast.

10. The apparatus according to claim 9 including at least one cup assembly housing mounted on said support hoop, said at least one cup assembly housing having a cavity defined therein adapted to receive a roller housing secured to the mast.

11. The apparatus according to claim 10 wherein said at least one cup assembly housing includes an opening in fluid communication with said cavity, whereby, when an inlet end of the suction conduit is mounted on said opening and said cavity is mounted in fluid communication with the interior channel of the outer mast, the suction conduit is in fluid communication with the interior channel.

12. The apparatus according to claim 7 further including a control cabinet operative to control the flow of fluid through said injection conduit and into said interior channel and to analyze the fluid collected in said suction conduit.

13. The apparatus according to claim 7 wherein said clamp member includes a base member having first and second ends, a lip extending upwardly from said first end, and a movable clamp face associated with said second end and selectively positionable with respect to said lip such that the distance between said lip and said clamp face may be selectively chosen to provide an interference fit between an inner surface of the mast and said lip and an outer surface of the mast and said clamp face.

14. The apparatus according to claim 13 wherein said clamp face is selectively positionable by sliding the same downwardly and inwardly at an angle such that as said clamp face moves toward said lip, said clamp face moves downwardly toward the lower end of the mast.

15. The apparatus according to claim 13 wherein said clamp face is selectively adjustable by means of a tool receiving head whereby the clamp member may be remotely adjusted.

* * * * *